(12) United States Patent
Lun

(10) Patent No.: US 7,753,180 B2
(45) Date of Patent: Jul. 13, 2010

(54) MAGNETORHEOLOGICAL PISTON HAVING A BYPASS PASSAGEWAY

(76) Inventor: Saiman Lun, 10582 Willow Brook Dr., Centerville, OH (US) 45458

( * ) Notice: Subject to any disclaimer, the term of this patent is extended or adjusted under 35 U.S.C. 154(b) by 589 days.

(21) Appl. No.: 11/820,812

(22) Filed: Jun. 20, 2007

(65) Prior Publication Data
US 2008/0314705 A1 Dec. 25, 2008

(51) Int. Cl.
*F16F 9/53* (2006.01)
(52) U.S. Cl. ............... 188/267.2; 188/267; 188/322.15
(58) Field of Classification Search ........... 188/267, 188/267.1, 267.2, 322.13, 322.15, 282.5, 188/282.6; 267/140.14, 140.15; 139/909
See application file for complete search history.

(56) References Cited

U.S. PATENT DOCUMENTS

| | | | | |
|---|---|---|---|---|
| 4,535,877 A | * | 8/1985 | Shimokura | 188/282.4 |
| 6,095,486 A | * | 8/2000 | Ivers et al. | 188/267 |
| 6,158,470 A | * | 12/2000 | Ivers et al. | 137/909 |
| 6,419,058 B1 | * | 7/2002 | Oliver et al. | 188/267.2 |
| 6,637,557 B2 | * | 10/2003 | Oliver et al. | 188/267.2 |
| 2003/0000781 A1 | * | 1/2003 | Oliver et al. | 188/267.2 |
| 2004/0118646 A1 | * | 6/2004 | Lun | 188/267 |

FOREIGN PATENT DOCUMENTS

KR 2007103858 A * 10/2007

* cited by examiner

*Primary Examiner*—Thomas J Williams
(74) *Attorney, Agent, or Firm*—Dickinson Wright PLLC; William H. Honaker

(57) ABSTRACT

A magnetorheological (MR) piston includes an MR piston core, an MR piston end plate, a shim disc, and a flexible orifice disc. The end plate covers an end of the core to define a chamber and has a through passageway aligned with an MR-piston-core bypass passageway at the chamber. The shim disc and the orifice disc are positioned in the chamber. The orifice disc includes an orifice aligned with the bypass passageway at the chamber and includes an additional orifice. Under fluid pressure in a first direction the orifice disc lies substantially flat against one of the end and the MR piston end plate. Under fluid pressure in an opposite second direction the orifice disc is deflected by the presence of the shim disc to lift the additional orifice from the one of the end and the MR piston end plate.

20 Claims, 4 Drawing Sheets

US 7,753,180 B2

MAGNETORHEOLOGICAL PISTON HAVING A BYPASS PASSAGEWAY

TECHNICAL FIELD

The present invention relates generally to piston dampers, and more particularly to a magnetorheological (MR) piston having a magnetically non-energizable passageway.

BACKGROUND OF THE INVENTION

Conventional piston dampers include MR dampers having a tube containing an MR fluid and having an MR piston assembly including a piston which slideably engages the tube and including a rod which has a first end attached to the piston and a second end extending outside the tube. The MR fluid passes through an MR passageway (i.e., a magnetically energizable passageway) of the MR piston. Exposing the MR fluid in the orifice to a varying magnetic field, generated by providing a varying electric current to an electric coil of the MR piston, varies the damping effect of the MR fluid in the MR passageway providing variably-controlled damping of relative motion between the MR piston and the tube. The electric current is varied (including turning off the electric current) to accommodate varying operating conditions, as is known to those skilled in the art. The tube and the rod are attached to separate structures to dampen relative motion of the two structures along the direction of piston travel. The damping from the MR passageway is the same for jounce (compression of the damper) and rebound (extension of the damper) for the same value of electric current applied to the electric coil of the MR piston.

A known design includes an MR piston having an MR passageway and a bypass passageway (i.e., a magnetically non-energizable passageway). In one known application, the MR damper is employed as a vehicle suspension damper to control vehicle ride and handling including damping during jounce and rebound. An orifice disc having a single orifice is positioned between the bypass passageway and a through passageway in the distal MR piston end plate of the MR piston. The damping from the bypass passageway is the same for jounce and rebound. A tapered MR passageway design is known which provides different damping for jounce and rebound for higher piston velocities. Externally-mounted apparatus having a bypass passageway with a spring-biased blow-off disc is known, wherein the apparatus is radially-outwardly mounted to the MR piston to provide different damping for jounce and rebound for higher piston velocities.

What is needed is an improved magnetorheological piston having a bypass passageway.

SUMMARY OF THE INVENTION

A first expression of a first embodiment of the invention is for a magnetorheological (MR) piston including an MR piston core, an MR piston end plate, a shim disc, and a flexible orifice disc. The MR piston core includes an end and includes a bypass passageway. The MR piston end plate covers the end to define a chamber between the end and the MR piston end plate and has a through passageway aligned with the bypass passageway at the chamber. The shim disc is positioned in the chamber apart from the bypass and through passageways. The orifice disc is positioned in the chamber, faces the shim disc, extends past the shim disc and the bypass passageway, includes an orifice aligned with the bypass passageway at the chamber, and includes an additional orifice. Under fluid pressure in a first direction the orifice disc lies substantially flat against one of the end and the MR piston end plate allowing fluid communication between the bypass passageway and the through passageway by way of the orifice but not by way of the additional orifice. Under fluid pressure in an opposite second direction the orifice disc is deflected by the presence of the shim disc to lift the additional orifice from the one of the end and the MR piston end plate allowing fluid communication between the bypass passageway and the through passageway by way of the orifice and by way of the additional orifice.

A second expression of a first embodiment of the invention is for a magnetorheological (MR) piston including an MR piston core, an MR piston end plate, a shim disc, and a flexible orifice disc. The MR piston core includes a central longitudinal axis, includes an end having a recessed portion, and includes a longitudinally-extending bypass passageway extending to the recessed portion. The MR piston end plate is coaxially aligned with the longitudinal axis, covers the recessed portion to define a chamber between the recessed portion and the MR piston end plate, and has a longitudinally-extending through passageway aligned with the bypass passageway. The shim disc is coaxially aligned with the longitudinal axis, is positioned in the chamber radially inwardly apart from the bypass passageway, and is positioned proximate the recessed portion. The orifice disc is coaxially aligned with the longitudinal axis, is positioned in the chamber, is positioned proximate the shim disc and the MR piston end plate, extends radially outwardly past the shim disc and the bypass passageway, and includes an orifice aligned with the bypass passageway. The orifice disc also includes an additional orifice disposed radially outward from the shim disc and unaligned with any bypass passageway of the MR piston core and any through passageway of the MR piston end plate.

An expression of a second embodiment of the invention is identical to the second expression of the first embodiment except the shim disc is positioned proximate the MR piston end plate and the orifice disc is positioned proximate the shim disc and the recessed portion.

Several benefits and advantages are derived from one or more of the expressions of the first and second embodiments of the invention. In one example, the MR piston is an MR piston of a vehicle MR suspension damper and is controlled by a vehicle electronic control unit in response to sensor inputs such as, without limitation, steering, braking, acceleration, and road condition sensor inputs. In this example, the additional orifice provides a different damper force depending on whether the MR damper is in jounce (compression) or rebound (extension) and reduces the undesirable effect of the lag time between a change in steering, braking, etc. and applying a changed current to the electric coil of the MR damper to effect damping in the MR passageway of the MR piston core. The additional orifice design should provide different damping for jounce and rebound at lower piston velocities and should provide, compared with a conventional tapered MR passageway design or a conventional externally-mounted apparatus, an increased difference in damping for jounce and rebound at higher piston velocities.

DETAILED DESCRIPTION

Figure 1:
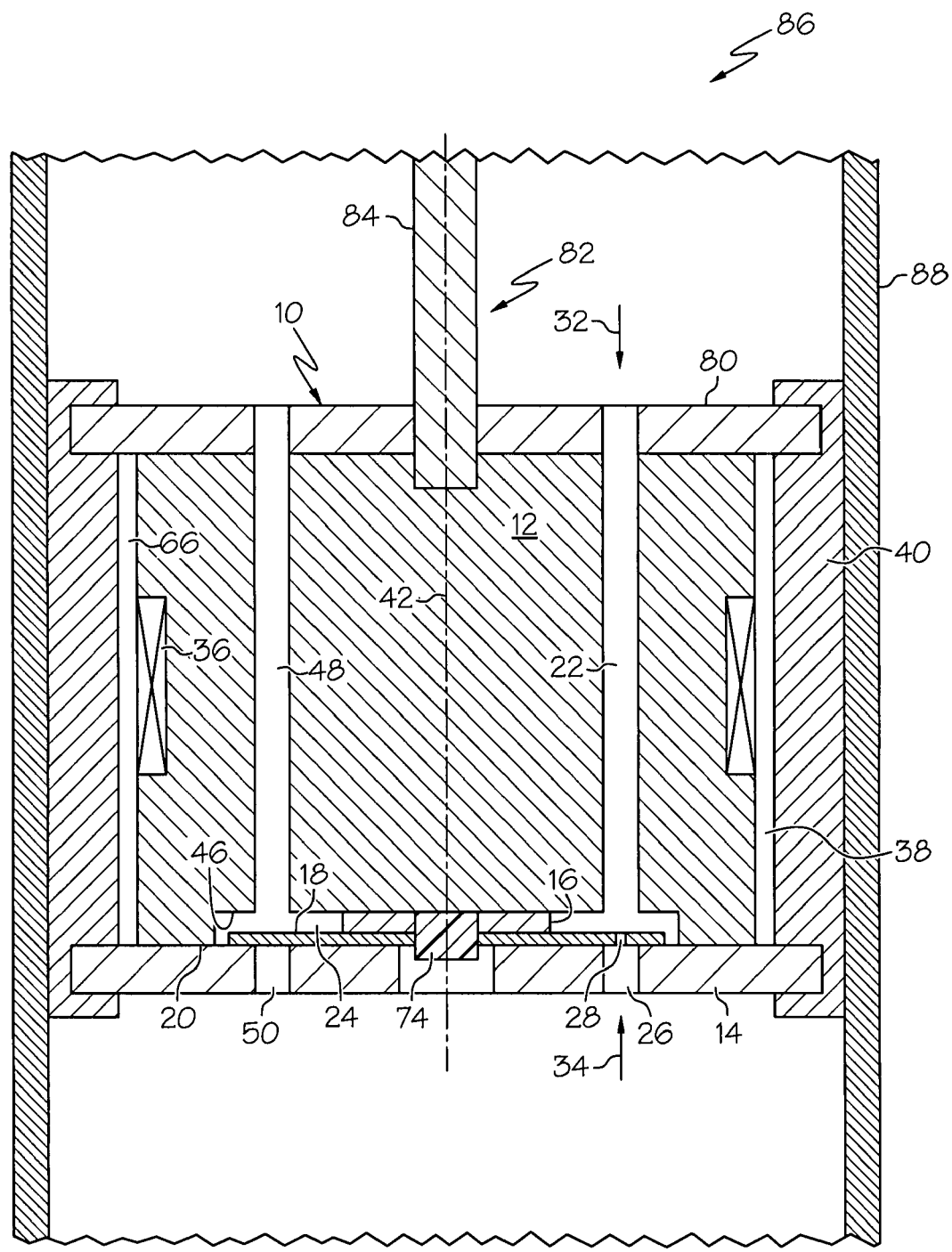
FIG. 1 is a schematic, cross-sectional view of a first embodiment of the invention showing an MR piston together with an attached piston rod and surrounding cylinder which together at least partially define an MR damper.
Figure 2:
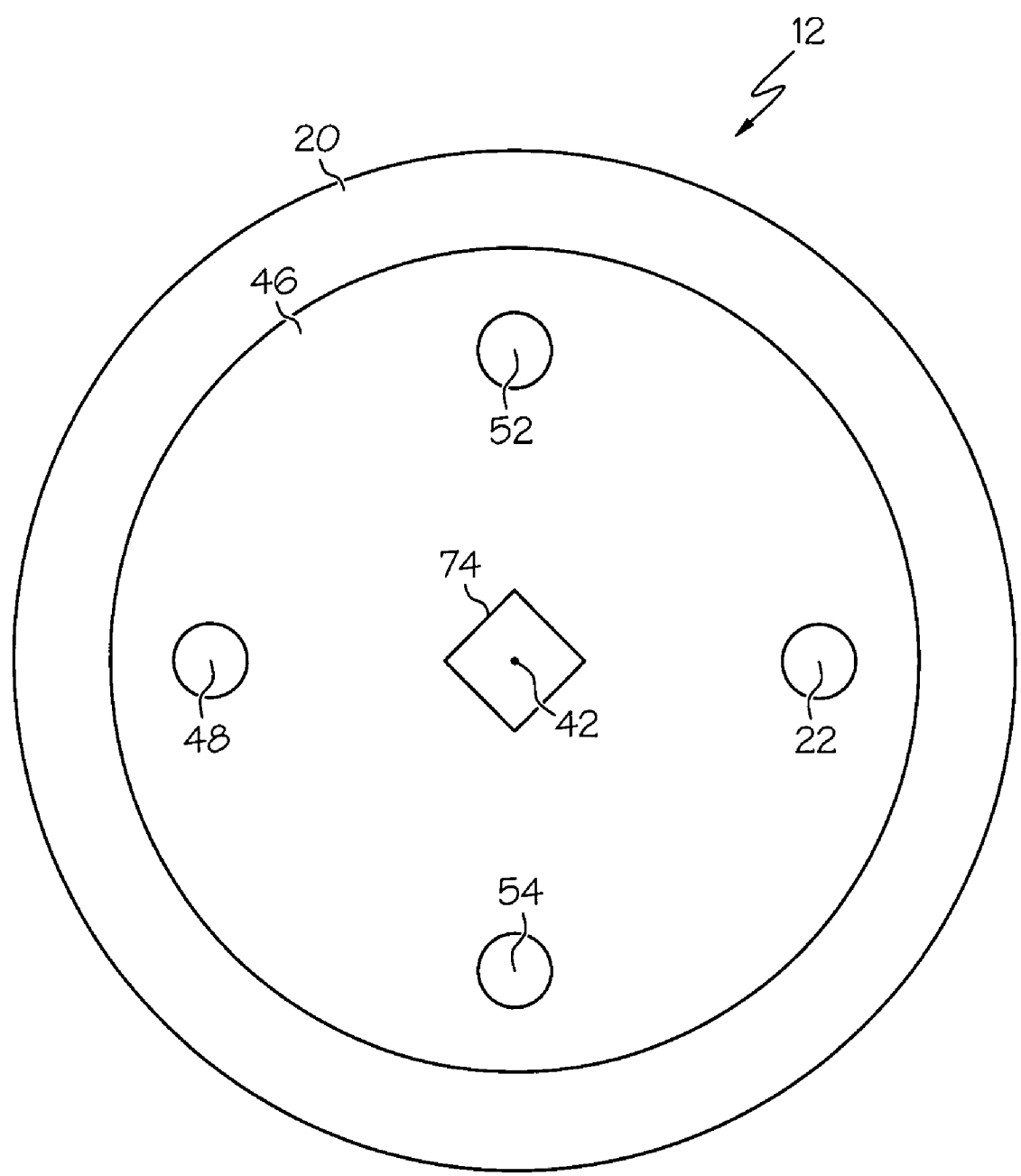
FIG. 2 is a longitudinal head-on view of the distal end of the MR piston core removed from of the MR piston of FIG. 1.
Figure 3:
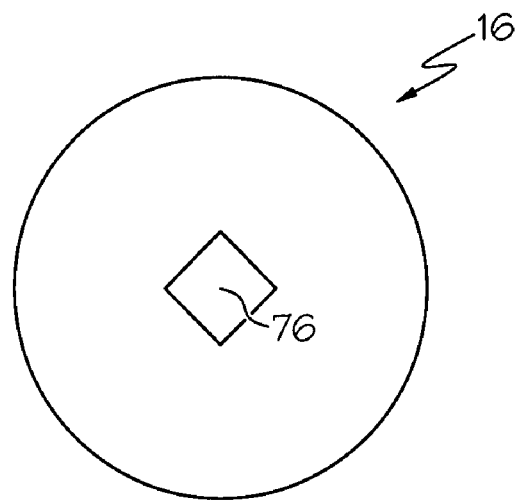
FIG. 3 is a longitudinal head-on view of the distal end of the shim disc removed from the MR piston of FIG. 1.
Figure 4:
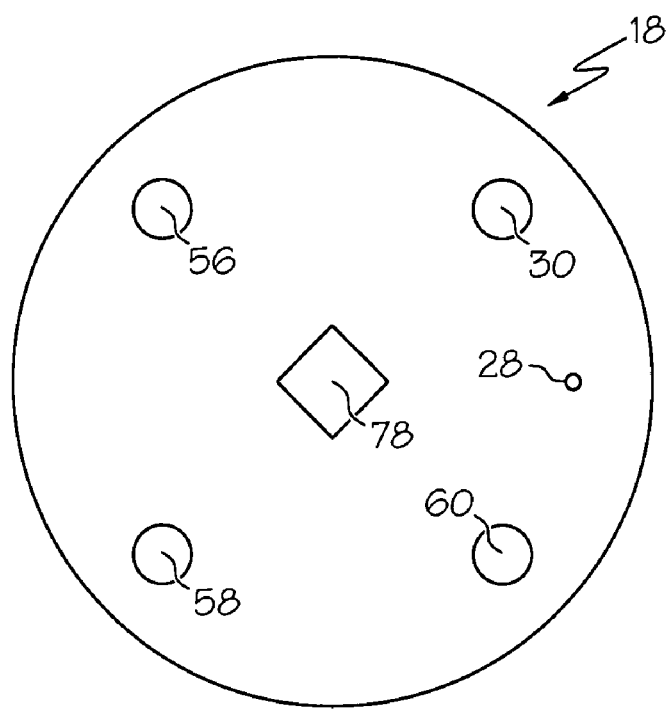
FIG. 4 is a longitudinal head-on view of the distal end of the orifice disc removed from the MR piston of FIG. 1.

Referring now to the drawings, FIGS. 1-5 (wherein FIGS. 2-5 are illustrated in rotational alignment) show an embodiment of the present invention. A first expression of the embodiment of FIGS. 1-5 is for a magnetorheological (MR) piston 10 including an MR piston core 12, an MR piston end plate 14, a shim disc 16, and a flexible orifice disc 18. The MR piston core 12 includes an end 20 and includes a bypass passageway (i.e., a magnetically non-energizable passageway) 22. The MR piston end plate 14 covers the end 20 to define a chamber 24 between the end 20 and the MR piston end plate 14 and has a through passageway 26 aligned with the bypass passageway 22 at the chamber 24. The shim disc 16 is positioned in the chamber 24 apart from the bypass and through passageways 22 and 26. The orifice disc 18 is positioned in the chamber 24, faces the shim disc 16, extends past the shim disc 16 and the bypass passageway 22, includes an orifice (sometimes called a standard orifice) 28 aligned with the bypass passageway 22 at the chamber 24, and includes an additional orifice 30. Under fluid pressure in a first direction 32 the orifice disc 18 lies substantially flat against one of the end 20 and the MR piston end plate 14 allowing fluid communication between the bypass passageway 22 and the through passageway 26 by way of the orifice 28 but not by way of the additional orifice 30. Under fluid pressure in an opposite second direction 34 the orifice disc 18 is deflected by the presence of the shim disc 16 to lift the additional orifice 30 from the one of the end 20 and the MR piston end plate 14 allowing fluid communication between the bypass passageway 22 and the through passageway 26 by way of the orifice 28 and by way of the additional orifice 30. It is noted that the term "aligned" means substantially aligned, and that the phrase "shim disc" includes a stack of shim discs and the phrase "orifice disc" includes a stack of orifice discs.

In one enablement of the first expression of the embodiment of FIGS. 1-5, the MR piston 10 also includes an electric coil 36 and a magnetically energizable passageway (i.e., an MR passageway) 38, wherein the electric coil 36 is disposed in the MR piston core 12. In one variation, the MR piston 10 includes an MR piston ring 40, wherein the MR piston core 12 has a central longitudinal axis 42 and wherein the MR piston ring 40 is attached to the MR piston end plate 14 and is radially spaced apart from the MR piston core 12 to define the magnetically energizable passageway 38. In one modification, the electric coil 36 is spaced radially between the bypass passageway 22 and the magnetically energizable passageway 38 and proximate the magnetically energizable passageway 38.

In one implementation of the first expression of the embodiment of FIGS. 1-5, the MR piston end plate 14 includes a through opening 44 in fluid communication with the magnetically energizable passageway 38. In the same or a different implementation, the MR piston core 12 has a central longitudinal axis 42, and the shim disc 16 and the orifice disc 18 are coaxially aligned with the longitudinal axis 42.

A second expression of the embodiment of FIGS. 1-5 is for a magnetorheological (MR) piston 10 including an MR piston core 12, an MR piston end plate 14, a shim disc 16, and a flexible orifice disc 18. The MR piston core 12 includes a central longitudinal axis 42, includes an end 20 having a recessed portion 46, and includes a longitudinally-extending bypass passageway 22 extending to the recessed portion 46. The MR piston end plate 14 is coaxially aligned with the longitudinal axis 42, covers the recessed portion 46 to define a chamber 24 between the recessed portion 46 and the MR piston end plate 14, and has a longitudinally-extending through passageway 26 aligned with the bypass passageway 22. The shim disc 16 is coaxially aligned with the longitudinal axis 42, is positioned in the chamber 24 radially inwardly apart from the bypass passageway 22, and is positioned proximate the recessed portion 46. The orifice disc 18 is coaxially aligned with the longitudinal axis 42, is positioned in the chamber 24, is positioned proximate the shim disc 16 and the MR piston end plate 14, extends radially outwardly past the shim disc 16 and the bypass passageway 22, and includes an orifice 28 aligned with the bypass passageway 22. The orifice disc 18 also includes an additional orifice 30 disposed radially outward from the shim disc 16 and unaligned with any bypass passageway 22 of the MR piston core 12 and any through passageway 26 of the MR piston end plate 14.

It is noted that the term "aligned" means substantially aligned, that the phrase "longitudinally-extending" means substantially-longitudinally-extending, and that the phrase "shim disc" includes a stack of shim discs and the phrase "orifice disc" includes a stack of orifice discs. It is also noted that the enablements, implementations, etc. of the first expression of the embodiment of FIGS. 1-5 are equally applicable to the second expression of the embodiment of FIGS. 1-5.

In one construction of the second expression of the embodiment of FIGS. 1-5, the MR piston core 12 includes an additional bypass passageway 48, wherein the MR piston end plate 14 includes an additional through passageway 50, wherein the additional through passageway 50 is aligned with the additional bypass passageway 48 but not with any additional orifice (such as additional orifice 30) of the orifice disc 18. In one variation, the MR piston core 12 includes second and third additional bypass passageways 52 and 54, the orifice disc 18 includes second, third and fourth additional orifices 56, 58 and 60, and the MR piston end plate 14 includes second and third additional through passageways 62 and 64. In one modification, the MR piston 10 includes an additional, a second additional and a third additional magnetically-energizable passageway (only the additional magnetically-energizable passageway 66 is shown), and the MR piston end plate 14 includes an additional, a second additional and a third additional through opening 68, 70 and 72. In one arrangement, the MR piston core 12 includes a rotational-alignment boss 74, wherein the shim disc 16 includes a corresponding rotational-alignment opening 76 and wherein the orifice disc 18 includes a corresponding rotational-alignment opening 78.

In one arrangement of the second expression of the embodiment of FIGS. 1-5, the orifice 28 has a smaller cross section than the bypass and through passageways 22 and 26. In one variation, the orifice (also known as a standard orifice) 28 has a smaller cross section than any of the additional orifices 30, 56, 58 and 60. In one modification, the orifice disc 18 has one, two or three more standard orifices, not shown, aligned one each with a corresponding one of the additional bypass passageways 48, 52 and 54. In the same or a different arrangement, the shim disc 16 abuts the recessed portion 46, and the orifice disc 18 abuts the shim disc 16 and the MR piston end plate 14.

In one extension of any of the expressions of the first embodiment of FIGS. 1-5, the MR piston 10 includes an additional MR piston end plate 80 for the other end of the MR piston core 12. It is noted that an additional expression of the embodiment of FIGS. 1-5 is for an MR piston assembly 82 which includes the MR piston 10 and a piston rod 84 which is attached to the MR piston 10. It is also noted that a further expression of the embodiment of FIGS. 1-5 is for an MR damper 86 which includes a cylinder 88 and the MR piston assembly 82, wherein the MR piston 10 is slidingly disposed within the cylinder 88.

A second embodiment of the invention is shown in FIG. 7. An expression of the embodiment of FIG. 7 is for an MR piston 110 and is identical to the second expression of the embodiment of FIGS. 1-5 except that the shim disc 16 is positioned proximate the MR piston end plate 14 and the orifice disc 18 is positioned proximate the shim disc 16 and the recessed portion 46.

It is noted that the enablements, implementations, constructions, etc. of the second expression of the embodiment of FIGS. 1-5 (except for the relative positions of the shim disc 16 and the orifice disc 18) are equally applicable to the expression of the embodiment of FIG. 7. In one arrangement of the expression of the embodiment of FIG. 7, the shim disc 16 abuts MR piston end plate 14, and the orifice disc 18 abuts the shim disc 16 and the recessed portion 46.

Figure 5:
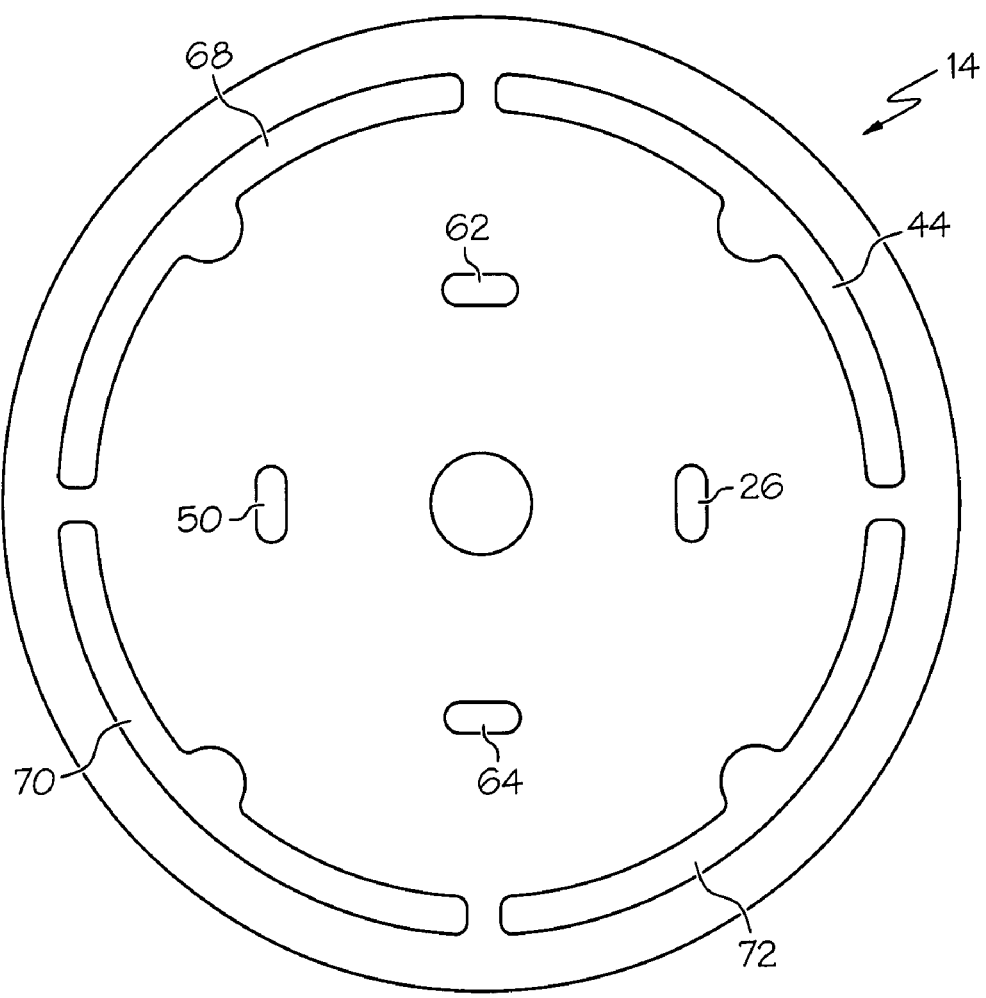
FIG. 5 is a longitudinal head-on view of the distal end of the MR piston end plate removed from the MR piston of FIG. 1.
Figure 6:
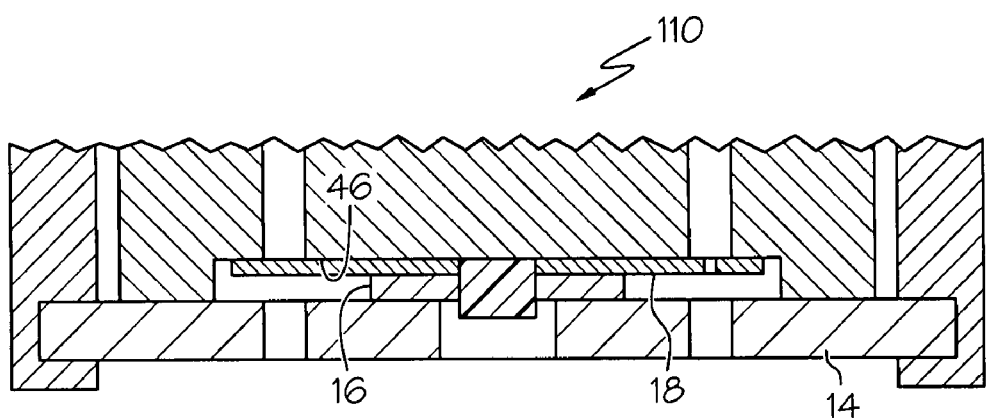
FIG. 6 is a schematic, cross-sectional view of a second embodiment of the invention showing a portion of an MR piston including an MR piston end plate, a shim disc, an orifice disc, and a portion of an MR piston core.

In one application of any of the expressions of the first and second embodiments of FIGS. 1-6, the size of the orifice 28, the number and size of the additional orifices 30, 56, 58 and 60, the thickness and flexibility of the orifice disc 18, and the diameter and thickness of the shim disc 16 are chosen to tune the MR piston 10 to create a desired asymmetric damping load by creating additional bypass flow paths which reduce on-state (i.e., the electric coil 36 is turned on) damping force in one piston direction. The additional bypass flow paths are created when the orifice disc 18 deflects which lifts the additional orifice(s). When the piston reverses in direction, the orifice disc flattens out and closes off the additional bypass flow paths. In this application, in the off state there is little or no deflection of the orifice disc 18 and most of the MR fluid (not shown) goes through the magnetically-energizable passageways. In this application, in a longitudinal head-on view, the magnetically-energizable passageways are similar in size and shape to, and are aligned with, the through openings 44, 68, 70 and 72 of the MR piston end plate 14 as seen in FIG. 5.

Several benefits and advantages are derived from one or more of the expressions of the first and second embodiments of the invention. In one example, the MR piston is an MR piston of a vehicle MR suspension damper and is controlled by a vehicle electronic control unit in response to sensor inputs such as, without limitation, steering, braking, acceleration, and road condition sensor inputs. In this example, the additional orifice provides a different damper force depending on whether the MR damper is in jounce (compression) or rebound (extension) and reduces the undesirable effect of the lag time between a change in steering, braking, etc. and applying a changed current to the electric coil of the MR damper to effect damping in the MR passageway of the MR piston core. The additional orifice design should provide different damping for jounce and rebound at lower piston velocities and should provide, compared with a conventional tapered MR passageway design or a conventional externally-mounted apparatus, an increased difference in damping for jounce and rebound at higher piston velocities.

The foregoing description of several expressions of embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

The invention claimed is:

1. A magnetorheological (MR) piston comprising:
  a) an MR piston core including an end and including a bypass passageway;
  b) an MR piston end plate covering the end to define a chamber between the end and the MR piston end plate and having a through passageway aligned with the bypass passageway at the chamber;
  c) a shim disc disposed in the chamber apart from the bypass and through passageways; and
  d) a flexible orifice disc disposed in the chamber, facing the shim disc, extending past the shim disc and the bypass passageway, including an orifice aligned with the bypass passageway at the chamber, and including an additional orifice, wherein under fluid pressure in a first direction the orifice disc lies substantially flat against one of the end and the MR piston end plate allowing fluid communication between the bypass passageway and the through passageway by way of the orifice but not by way of the additional orifice, and wherein under fluid pressure in an opposite second direction the orifice disc is deflected by the presence of the shim disc to lift the additional orifice from the one of the end and the MR piston end plate allowing fluid communication between the bypass passageway and the through passageway by way of the orifice and by way of the additional orifice.

2. The MR piston of claim 1, also including an electric coil and a magnetically energizable passageway, wherein the electric coil is disposed in the MR piston core.

3. The MR piston of claim 2, also including an MR piston ring, wherein the MR piston core has a central longitudinal axis and wherein the MR piston ring is attached to the MR piston end plate and is radially outwardly spaced apart from the MR piston core to define the magnetically energizable passageway.

4. The MR piston of claim 3, wherein the electric coil is spaced radially between the bypass passageway and the magnetically energizable passageway and proximate the magnetically energizable passageway.

5. The MR piston of claim 1, wherein the MR piston end plate includes a through opening in fluid communication with the magnetically energizable passageway.

6. The MR piston of claim 1, wherein the MR piston core has a central longitudinal axis and wherein the shim disc and the orifice disc are coaxially aligned with the longitudinal axis.

7. A magnetorheological (MR) piston comprising:
  a) an MR piston core including a central longitudinal axis, including an end having a recessed portion, and including a longitudinally-extending bypass passageway extending to the recessed portion;
  b) an MR piston end plate coaxially aligned with the longitudinal axis, covering the recessed portion to define a chamber between the recessed portion and the MR piston end plate, and having a longitudinally-extending through passageway aligned with the bypass passageway;

c) a shim disc coaxially aligned with the longitudinal axis, disposed in the chamber radially inwardly apart from the bypass passageway, and disposed proximate the recessed portion; and d) a flexible orifice disc coaxially aligned with the longitudinal axis, disposed in the chamber, disposed proximate the shim disc and the MR piston end plate, extending radially outwardly past the shim disc and the bypass passageway, and including an orifice aligned with the bypass passageway, wherein the orifice disc also includes an additional orifice disposed radially outward from the shim disc and unaligned with any bypass passageway of the MR piston core and any through passageway of the MR piston end plate.

8. The MR piston of claim 7, also including an electric coil and a magnetically energizable passageway, wherein the electric coil is disposed in the MR piston core.

9. The MR piston of claim 8, also including an MR piston ring, wherein the MR piston ring is attached to the MR piston end plate and is radially outwardly spaced apart from the MR piston core to define the magnetically energizable passageway.

10. The MR piston of claim 9, wherein the electric coil is spaced radially between the bypass passageway and the magnetically energizable passageway and proximate the magnetically energizable passageway.

11. The MR piston of claim 7, wherein the MR piston core includes an additional bypass passageway, wherein the MR piston end plate includes an additional through passageway, wherein the additional through passageway is aligned with the additional bypass passageway but not with any additional orifice of the orifice disc.

12. The MR piston of claim 7, wherein the orifice has a smaller cross section than the bypass and through passageways.

13. The MR piston of claim 7, wherein the shim disc abuts the recessed portion and wherein the orifice disc abuts the shim disc and the MR piston end plate.

14. A magnetorheological (MR) piston comprising:

a) an MR piston core including a central longitudinal axis, including an end having a recessed portion, and including a longitudinally-extending bypass passageway extending to the recessed portion;

b) an MR piston end plate coaxially aligned with the longitudinal axis, covering the recessed portion to define a chamber between the recessed portion and the MR piston end plate, and having a longitudinally-extending through passageway aligned with the bypass passageway;

c) a shim disc coaxially aligned with the longitudinal axis, disposed in the chamber radially inwardly apart from the through passageway, and disposed proximate the MR piston end plate; and d) a flexible orifice disc coaxially aligned with the longitudinal axis, disposed in the chamber, disposed proximate the shim disc and the recessed portion, extending radially outwardly past the shim disc and the bypass passageway, and including an orifice aligned with the bypass passageway, wherein the orifice disc also includes an additional orifice disposed radially outward from the shim disc and unaligned with any bypass passageway of the MR piston core and any through passageway of the MR piston end plate.

15. The MR piston of claim 14, also including an electric coil and a magnetically energizable passageway, wherein the electric coil is disposed in the MR piston core.

16. The MR piston of claim 15, also including an MR piston ring, wherein the MR piston ring is attached to the MR piston end plate and is radially outwardly spaced apart from the MR piston core to define the magnetically energizable passageway.

17. The MR piston of claim 16, wherein the electric coil is spaced radially between the bypass passageway and the magnetically energizable passageway and proximate the magnetically energizable passageway.

18. The MR piston of claim 14, wherein the MR piston core includes an additional bypass passageway, wherein the MR piston end plate includes an additional through passageway, wherein the additional through passageway is aligned with the additional bypass passageway but not with any additional orifice of the orifice disc.

19. The MR piston of claim 14, wherein the orifice has a smaller cross section than the bypass and through passageways.

20. The MR piston of claim 14, wherein the shim disc abuts the MR piston end plate and wherein the orifice disc abuts the shim disc and the recessed portion.

* * * * *